(12) United States Patent
Colucci

(10) Patent No.: US 9,740,089 B1
(45) Date of Patent: Aug. 22, 2017

(54) MODULAR CURVED PROJECTION SCREEN

(71) Applicant: The Elumenati, LLC, Milwaukee, WI (US)

(72) Inventor: D'nardo Colucci, Milwaukee, WI (US)

(73) Assignee: The Elumenati, LLC, Milwaukee, WI (US)

( * ) Notice: Subject to any disclaimer, the term of this patent is extended or adjusted under 35 U.S.C. 154(b) by 0 days.

(21) Appl. No.: 15/348,784

(22) Filed: Nov. 10, 2016

(51) Int. Cl.
   *G03B 21/56* (2006.01)
   *G03B 21/60* (2014.01)

(52) U.S. Cl.
   CPC ........... *G03B 21/565* (2013.01); *G03B 21/60* (2013.01)

(58) Field of Classification Search
   CPC .............................. G03B 21/60; G03B 21/565
   USPC ......................................................... 359/451
   See application file for complete search history.

(56) References Cited

U.S. PATENT DOCUMENTS

| | | | | | |
|---|---|---|---|---|---|
| 3,203,144 A | * | 8/1965 | Fuller | .................... | E04B 1/3211 52/537 |
| 3,348,897 A | * | 10/1967 | Hourdiaux | ............. | G03B 21/58 352/61 |
| 4,473,355 A | * | 9/1984 | Pongratz | .................. | G09B 9/32 359/451 |
| 5,130,846 A | * | 7/1992 | Kowalchuk | ............ | G03B 21/56 359/443 |
| 5,400,178 A | * | 3/1995 | Yamada | .................. | G03B 21/62 359/443 |
| 5,437,756 A | * | 8/1995 | Carlos | ....................... | G09B 9/14 156/242 |
| 6,128,130 A | * | 10/2000 | Zobel, Jr. | ................ | G03B 21/56 359/443 |
| 2006/0274413 A1 | * | 12/2006 | Hopper | .................. | G03B 21/56 359/451 |

* cited by examiner

*Primary Examiner* — Christopher Mahoney
(74) *Attorney, Agent, or Firm* — Schwegman Lundberg & Woessner, P.A.

(57) ABSTRACT

A modular curved projection screen includes an outer structural component formed of multiple compound curved interlocking sections. Multiple inner compound curved screen components are each supported by a corresponding compound curved interlocking section and extend beyond edges of the interlocking sections. Responsive to interlocking the multiple compound curved interlocking sections, edges of adjacent screen components are compressed against each other to form a smooth concave projection viewing area supported by the outer structural component.

20 Claims, 3 Drawing Sheets

MODULAR CURVED PROJECTION SCREEN

BACKGROUND

Large scale concave, compound curve projection screens are most commonly constructed of formed and painted perforated aluminum panels attached to a steel outer frame. This technology is not portable and is expensive and fragile. Such screens do not readily scale down to systems below 25 feet in diameter. Large scale mobile screen surfaces can be created with a fabric envelope covering a frame structure and then using a vacuum between the surfaces to create the desired shape. Fabric screen surfaces show a seam between adjacent panels and exhibit pillowing caused by the differential stretching of the fabric panel. Smaller screen surfaces are often made using shaped FRG (fiberglass reinforced gypsum) board (drywall) and joint compound or molded fiberglass. These solutions are again not mobile and have the additional issue of acoustical reflections that degrade the user experience. Lastly a modular spherical screen assembly exists, but requires color matching filler between the seams of each rigid module which is not only time consuming but eliminates portability.

SUMMARY

A modular projection screen includes multiple curved outer shell subsections, multiple curved inner shell subsections formed of compressible material and supported by corresponding outer shell subsections, the inner shell subsections extending beyond the edges of the corresponding outer shell subsections, and connectors coupled to the curved outer shell subsections to couple the outer shell subsections to each other causing the compressible material of adjacent inner subsections to compress, forming a seamless viewing screen.

A modular curved projection screen includes an outer structural component formed of multiple compound curved interlocking sections. Multiple inner compound curved screen components are each supported by a corresponding compound curved interlocking section and extend beyond edges of the interlocking sections. Responsive to interlocking the multiple compound curved interlocking sections, edges of adjacent screen components are compressed against each other to form a smooth concave projection viewing area supported by the outer structural component.

A method of assembling a modular projection screen includes bringing two subsections of a multiple subsection modular projection screen together such that adjacent inner screen components are compressed together, fastening the subsections together such that a seam where the inner screen components are compressed together is smooth, and repeating the bringing together and fastening of additional subsections to already fastened subsections to form a concave modular projection screen.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A modular curved projection screen is formed of an outer structural component that supports multiple inner compound curved screen components. The multiple compound curved screen components create concave viewing area for projection of images on to the compound curved screen components. The curved screen components have perimeter edges that are compressed together to form a seamless viewing area. The edges of the screen components may form a smooth surface similar to a typical projection screen with no gaps and no bulging such that the edges disappear to an ordinary viewer under projection of an image. In some embodiments, the inner screen components are formed of a material that is acoustically transparent.

Figure 1:
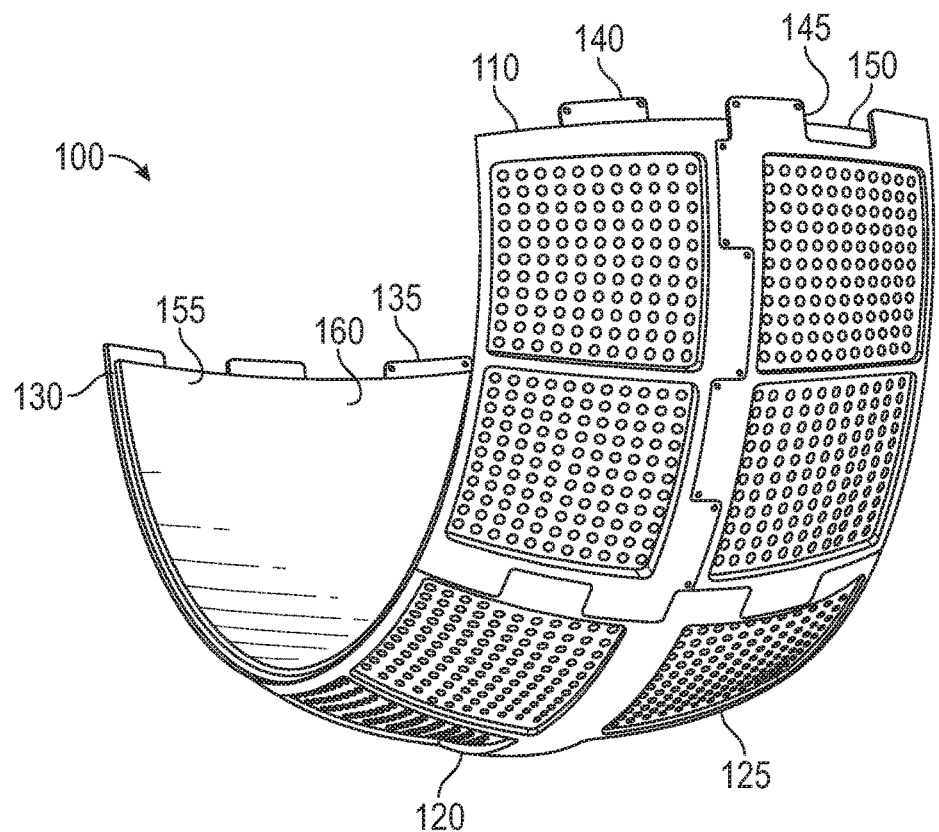
FIG. 1 is a perspective view of multiple screen subsections assembled into a modular projection screen according to an example embodiment.

FIG. 1 is a perspective view of a modular compound curved projection screen 100 forming a symmetric panoramic section of a sphere using six identical single sphere outer shell subsections 110, 115, 120, 125, 130, and 135. Each outer shell subsection sweeps 60 degrees horizontally by 30 degrees vertically. The outer shell subsections are interlocked in two rows of three producing an overall screen section of 180 degrees by 60 degrees. Interlocking may be performed by mating protrusions that partially overlap on adjacent subsections. A first type of protrusion indicated at 140 may be a flat protrusion that overlaps with a second type of protrusion indicated at 145 that has an indentation 150 that a first type of protrusion 140 overlaps with when adjacent outer shell sections are coupled. Each outer shell subsection may have one or more of each type of protrusion to align and couple to adjacent outer shell subsection protrusions and indentations. Protrusion 140, for example may similarly have indentations on either side of it to mate with a subsection having protrusions like protrusion 145.

In one embodiment, each outer shell subsection has a laminated inner screen subsection 155, 160 which are visible in FIG. 1 and form a screen for projection of images. The outer shell subjections form an outer structural component of the projection screen 100. The outer shell subsections are designed to interlock via the projections in a retentive manner, such as by use of screws, bolts, knuckles, interlocking modules, or other means of locking into each other from the back side, which is opposite the laminated inner screen subsections. The interlocking modules may lock from the back of the screen being assembled (outside the viewing area) or in some embodiments may lock when a module is inserted from the inner screen side of the projection screen. The outer shell subsections may be formed of metal, polymer, or other materials that provide sufficient structural integrity to support themselves and the inner screens subsections.

Figure 2:
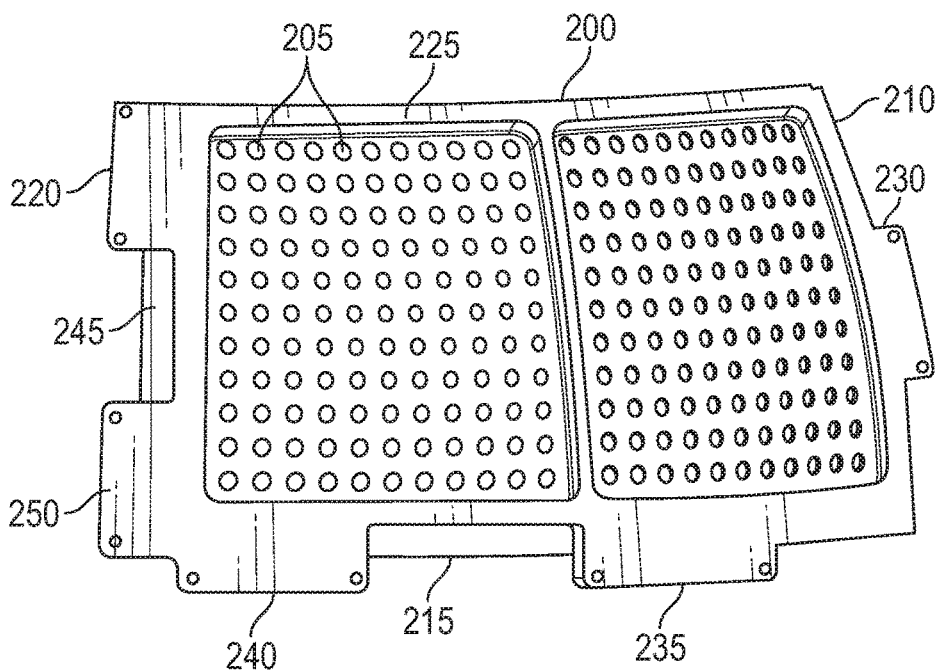
FIG. 2 is a front elevation view of an outside of an outer shell subsection of the modular projection screen according to an example embodiment.

FIG. 2 is a perspective view of a single screen subsection 200, such as corresponding to screen subsection 110. Screen subsection 200 consists of a perforated outer shell skin having a desired radius of curvature. The radius of curvature corresponds directly with the overall size and shape of a desired projection screen. The shape defines the curved outer shell surface to which the laminated inner screen subsection 205, which may be formed of foam, is laminated. Perforations 210 (or any other style of openings) may be formed in the outer shell subsection 200 to allow sound to pass freely through the subsections. The perforated outer shell subsection may be reinforced with a thicker skeleton to strengthen the overall structure in some embodiments. Edges 210, 215, 220, 225 have protrusions, referred to as tabs for interlocking between outer shell subsections. Edge 210 has a tab 230, edge 215 has tabs 235 and 240, and edge 220 has tabs 245 and 250. Edge 225 forms an outer edge of the overall screen when multiple subsections are joined together. Indentations may be formed between the tabs to mate with tabs on adjacent subsection edges.

In further embodiments, edge 225 may have one or more tabs such that subsection 200 may be an inner subsection having other subsections adjacent to each edge. Such inner subsections when combined with multiple screen subsections 200 allow the formation of modular projection screens in the shape of partial to full spheres in extent or to any compound curved shape.

Figure 3:
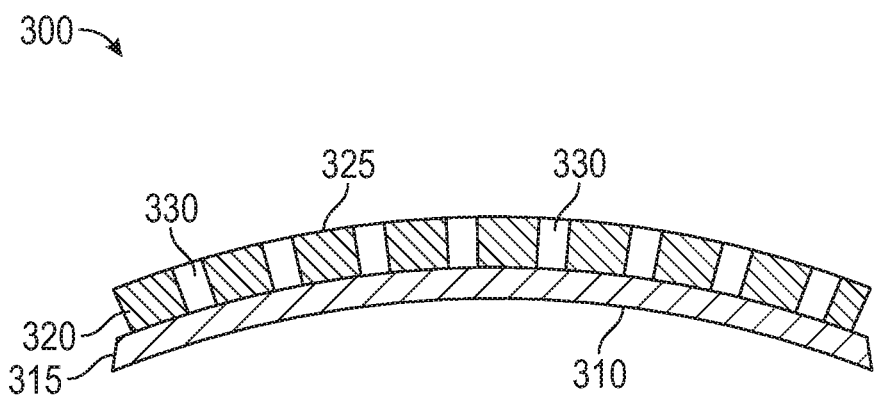
FIG. 3 is a cross section view of a screen subsection having a tapered inner shell subsection according to an example embodiment.

FIG. 3 is a representation of a close-up view of an edge of a single subsection 300 with inner shell foam 310. Notice that the foam 310 may extend slightly beyond the edge 320 of the subsection 300 outer shell 325. The foam edge may taper outward slightly from the side of the foam mounted on the outer shell 325. The taper ensures that when two subsections are brought together, the inside surface of the foam on the viewing side of a foam contacts an adjacent tapered edge of foam and compresses to form a smooth inside viewing surface. In further embodiments, the foam may extend slightly beyond a point where the foam could mate with an adjacent subjection without the taper. When assembled this extended edge may be compressed against the extended edge of the adjacent section inner shell foam forming a smooth abutment.

Figure 4:
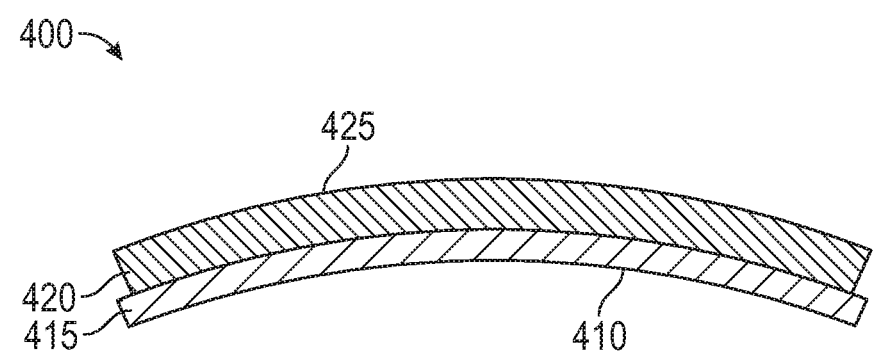
FIG. 4 is a cross section view of a screen subsection showing an inner shell subsection overlapping an outer shell subsection according to an example embodiment.

FIG. 4 is a cross section view of a screen subsection 400 showing an inner shell subsection 410 overlapping an outer shell subsection according to an example embodiment. The overlap is indicated at an end of the inner shell at 415 extending slightly beyond and end 420 of the outer shell subsection 425. Note that the end 415 need not be tapered.

The outer shell subsections form an outer structural component facilitating assembly of individual subsections into the desired overall screen shape. For example, a 120 degree compound curve could be created with four connected subsections each sweeping 30 degrees. The final assembly of subsections may form a final structure that is stable under its own weight and strong enough to support the weight of projectors used to project images on the inner screen components.

The outer screen subsections may also include multiple perforations or holes 330 to be acoustically transparent to allow sound to pass through the outer screen subsections.

The inner screen subsections provide a good surface on which to project a digital image. The inside surface of the inner screen components may be smooth like a typical projection screen. Edges of one inner surface laminated to a subsection abut to the edge of the adjacent inner surface smoothly with no gaps and no bulging such that it disappears under projection. The inner surface may also be acoustically transparent, which may be achieved in one embodiment by using an open cell foam to form the inner surface that is dyed prior to casting to obtain an optimal screen color, such as grey, for projection of images. The color may be varied to obtain a desired screen color. An alternative material for the inner surface includes Poron® gasket foam having a thickness of between approximately ½ to ¼ inch and has perforations to achieve acoustic transparency. Other thicknesses and materials that provide a good projection viewing surface and compression characteristics may be used in further embodiments.

The inner surface for each subsection may be laser cut, either prior to lamination of the outer shell subsections, or after lamination to provide an accurate mating edge to mate with foam on adjacent subsections when assembled. The inner surface is oversized slightly compared to the outer shell surface and extends or overlaps beyond the mating edges of the outer screen subsections by 0.5-4 mm in one embodiment.

The inner surface compresses when subsections are assembled abutting each other. The overlap provides for such compression without creating significant human perceptible deformations of the resulting viewing surface of the projection screen. The amount of extension may be adjusted based on the type of inner surface used and the inner surface's compressibility without deformation of the viewing surface of the projection screen. The inner surface is referred to as being laminated onto the outer shell subsections, which means that the inner surface is attached to form a layer over the outer shell subsections. The inner surface may be attached to the outer shell subsections by any means, such as via adhesive, or may even be sprayed onto the outer shell subsections and trimmed to provide a desired extension length for suitable compression with adjacent subsection inner surfaces.

A modular projection screen surface consists of an assembly of subsections, with each subsection having an outer shell and a foam screen surface. The outer shells may be interlocking to form a desired compound curve screen shape. The outer shells may have an inner surface in the shape of the desired screen surface and may include perforations or similar to allow sound to pass freely. In some embodiments, the outer shells may provide a skeleton-like function for structural rigidity, or may even attach to an external structure for increased structural rigidity.

The inner surface (foam or similar material) forming a screen surface is laminated to the outer shell and extends slightly beyond the edges of the outer shell and abuts to the foam surface of adjacent sections forming a nearly invisible seam. The inner surface may be acoustically transparent in some embodiments. The inner surface, may be formed of foam having a durometer rating, thickness and overlap optimized to allow compression without showing artifacts on the screen surface. The foam may be pre-colored (such as grey) to optimize the quality of the projected image.

Structural tabs on each subsection may be used to interlock and connect to adjacent subsections from the back side. A connector (knuckle) may be used to connect adjacent subsections allowing the subsections to be inserted from the front (screen) side or the back side.

Many different methods of assembling the screen may be employed, either in a manufacturing setting, or at a customer location. In one embodiment, the screen may be too large for convenient shipping, or the customer may prefer to store the screen and use it occasionally, setting the screen up for each use.

One method of assembling a modular projection screen includes bringing two subsections of a multiple subsection modular projection screen together such that adjacent inner screen components are compressed together, fastening the subsections together such that a seam where the inner screen components are compressed together is smooth, and repeating the bringing together and fastening of additional subsections to already fastened subsections to form a concave modular projection screen. The subsections should be brought together to ensure proper mating, followed by compression, of the inner screen components to create a smooth seam.

In one embodiment, the installation may be performed from the inside, or viewer side of the screen. Inner screen overlap may be relied upon to create an acceptable seam.

Each subsection may be formed of an outer acoustically transparent structural subsection supporting a corresponding inner screen component that extend beyond edges of the outer structural subsections, The inner screen component may be formed of grey dyed compressible open cell foam that is acoustically transparent.

The size and number of subsections and radius of curvature of each, will determine the size of the resulting concave projection screen. Significant variation in size and dimension may be made to obtain both convenience of storage and assembly.

Figure 5:
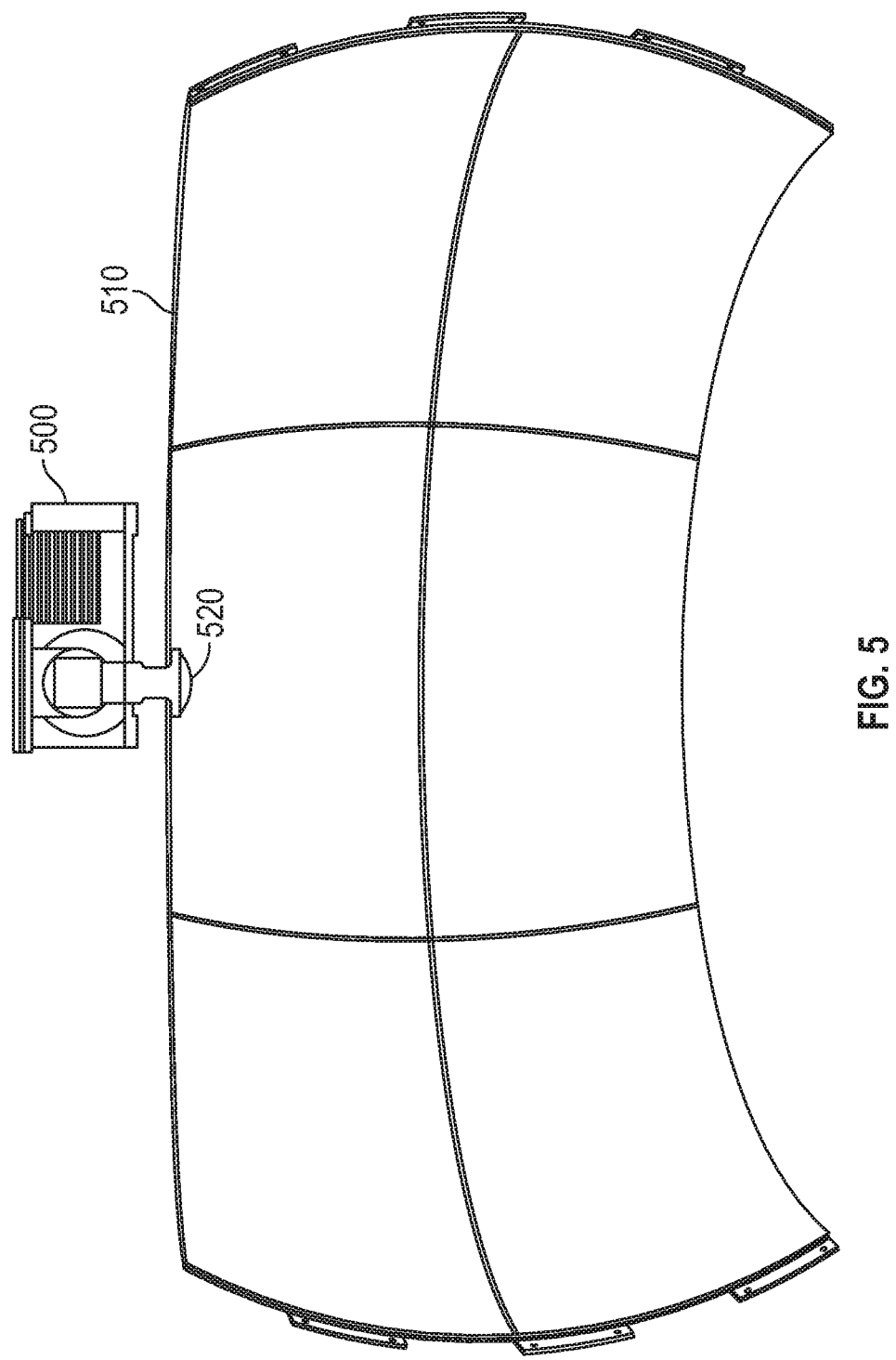
FIG. 5 is a block diagram view of a module projection system having a projector and multiple compound curved subsections according to an example embodiment.

FIG. 5 is a block diagram view of a projection system including a projector 500 that is adapted to project images onto multiple compound curved subsections forming a projection screen 510 according to an example embodiment. Six subsections are shown in a 2×3 form. The size of the subsections may be varied to just about any size desired that will not result in warping of the overall screen 510. The screen 510 may cover an arc of 120 degrees for example, or smaller or larger arcs. The projector 500 may be positioned to project images onto the screen from the same side as a viewer. The projector may be provided with a lens 520 adapted to project the images onto the screen 510 from the position selected for the projector, which may be supported separately from the screen by tripod, ceiling mount, or other support structure, or may supported by the screen via an arm extending out from the screen. In some embodiments, the subsection's outer shells provide suitable support for allowing the screen to be supported free-standing on a floor or other surface.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A modular projection screen comprising:
   multiple curved outer shell subsections;
   multiple curved inner shell subsections formed of compressible material and supported by corresponding outer shell subsections, the inner shell subsections extending beyond the edges of the corresponding outer shell subsections; and
   connectors coupled to the curved outer shell subsections to couple the outer shell subsections to each other causing the compressible material of adjacent subsections to compress to form a seamless viewing screen.

2. The modular projection screen of claim 1 wherein the multiple curved outer shell subsections have an equal radius of curvature such that when coupled they form a semi-spherical outer shell.

3. The modular projection screen of claim 1 wherein the multiple curved outer shell subsections include perforations such that the outer shell subsections are acoustically transparent.

4. The modular projection screen of claim 1 wherein the inner shell subsections are laminated to the corresponding outer shell subsections.

5. The modular projection screen of claim 1 wherein the inner shell subsections are formed of open cell foam such that the inner shell subsections are acoustically transparent.

6. The modular projection screen of claim 1 wherein the inner shell subsections are formed of perforated foam such that the inner shell subsections are acoustically transparent.

7. The modular projection screen of claim 1 wherein the inner shell subsections are grey in color.

8. The modular projection screen of claim 1 wherein the inner shell subsections extend beyond the edges of the outer shell subsections by approximately 0.5-4 mm.

9. The modular projection screen of claim 1 wherein the inner shell subsections are tapered where they extend beyond the edges of the outer shell subsections.

10. The modular projection screen of claim 1 wherein the connectors comprise interlocking modules.

11. The modular projection screen of claim 1 wherein the outer shell subsections comprise mating protrusions to align and couple to adjacent outer shell subsections.

12. A modular curved projection screen comprising:
    an outer structural component formed of multiple compound curved interlocking sections;
    multiple inner compound curved screen components each supported by a corresponding compound curved interlocking section and extending beyond edges of the interlocking sections such that responsive to interlocking the multiple compound curved interlocking sections, edges of adjacent screen components are compressed against each other to form a smooth concave projection viewing area supported by the outer structural component.

13. The modular curved projection screen of claim 12 wherein the multiple compound curved interlocking sections have an equal radius of curvature such that when coupled they form a semi-spherical outer shell.

14. The modular curved projection screen of claim 12 wherein the multiple compound curved interlocking sections include perforations such that the outer structural component is acoustically transparent.

15. The modular curved projection screen of claim 12 wherein the inner compound curved screen components are laminated to the corresponding curved interlocking sections.

16. The modular curved projection screen of claim 12 wherein the inner compound curved screen components are formed of open cell foam such that the inner shell subsections are acoustically transparent.

17. The modular curved projection screen of claim 12 wherein the inner compound curved screen components are grey in color.

18. The modular curved projection screen of claim 12 wherein the inner compound curved screen components extend beyond the edges of the compound curved interlocking sections by approximately 0.5 to 4 mm.

19. The modular curved projection screen of claim 12 wherein the inner compound curved screen components are tapered where they extend beyond the edges of the compound curved interlocking sections.

20. A method comprising:
- bringing two subsections of a multiple subsection modular projection screen together such that adjacent inner screen components are compressed together;
- fastening the subsections together such that a seam where the inner screen components are compressed together is smooth; and
- repeating the bringing together and fastening of additional subsections to already fastened subsections to form a concave modular projection screen.

* * * * *